United States Patent [19]

Pflüger

[11] 4,350,725
[45] Sep. 21, 1982

[54] FABRIC AND GARMENT OF CIRCULAR WEFT-KNIT OR CIRCULAR WARP-KNIT MATERIAL

[75] Inventor: Helmut C. Pflüger, Neumünster, Fed. Rep. of Germany

[73] Assignee: Norddeutsche Faserwerke GmbH, Neumünster, Fed. Rep. of Germany

[21] Appl. No.: 279,990

[22] PCT Filed: Oct. 24, 1980

[86] PCT No.: PCT/DE80/00161
§ 371 Date: Jun. 25, 1981
§ 102(e) Date: Jun. 25, 1981

[51] Int. Cl.³ ............................. B32B 3/02; B32B 33/00
[52] U.S. Cl. ............................ 428/95; 428/253; 428/254; 428/257; 428/266; 428/423.1; 428/423.7; 428/447
[58] Field of Search .................. 428/36, 85, 93, 95, 428/96, 253, 254, 257, 265, 266, 447, 423.1, 423.7

[56] References Cited

U.S. PATENT DOCUMENTS

| | | | |
|---|---|---|---|
| 3,255,068 | 6/1966 | Smith | 428/253 |
| 3,481,821 | 12/1969 | Brunner et al. | 428/96 |
| 3,637,427 | 1/1972 | Tsuruta et al. | 428/254 |
| 3,926,700 | 12/1975 | Hopkins et al. | 428/96 |
| 3,948,722 | 4/1976 | Wheeldon et al. | 428/254 |
| 4,172,165 | 10/1979 | Kuckhefer et al. | 428/254 |
| 4,228,194 | 10/1980 | Meeder | 428/288 |
| 4,233,358 | 11/1980 | Jones et al. | 428/254 |

Primary Examiner—James J. Bell
Attorney, Agent, or Firm—Oblon, Fisher, Spivak, McClelland & Maier

[57] ABSTRACT

The resistance to deformation for extensions ranging up to 70% of the breaking elongation of a polyurethane-coated circular weft-knit or circular warp-knit fabric, especially such a fabric made from textured continuous-filament yarn with interlock bonding, is reduced by a polysiloxane elastomer finish to a value as low as one-fifth of that of polyurethane-coated fabric which does not have a polysiloxane elastomer finish. Such fabric is especially suitable for sport clothing, as well as all-weather clothing and stylish clothing.

8 Claims, 6 Drawing Figures

FABRIC AND GARMENT OF CIRCULAR WEFT-KNIT OR CIRCULAR WARP-KNIT MATERIAL

BACKGROUND OF THE INVENTION

1. Field of the Invention

This invention relates to circular weft-knit or circular warp-knit polyurethane-coated stretch fabrics made from synthetic filament yarn, especially polyester yarn, and garments made therefrom.

2. Description of Prior Art

Elastic, polyurethane-coated interlock circular knitted goods of this type made from polyester have been disclosed, for example, in French Published Patent Application No. 22 16 111. Although these goods are elastic by reason of the elasticity of the mesh, their great resistance to deformation makes them for the most part unsuitable for many applications and in particular they are not suitable for garments which are worn next to the body and fit closely during movement of the body.

SUMMARY OF THE INVENTION

It has been discovered that polyurethane-coated circular weft-knit or circular warp-knit goods made from synthetic yarn, especially polyester filament yarn, have an especially low resistance to deformation when the circular weft-knit or circular warp-knit goods are made of textured continuous filament yarn and are provided with a polysiloxane elastomer finish. The resistance to deformation, as compared with uncoated goods, is decreased in the ratio of 1:1.1 to 1:5, preferably 1:1.5 to 1:3.5, for extensions ranging up to 70% of the breaking elongation with an elastic recovery of 85% of the extension applied during use.

DETAILED DESCRIPTION OF THE INVENTION AND PREFERRED EMBODIMENTS

The yarns can be made of the same or different fiber materials, using untwisted, twisted or plied continuous filaments. The yarns may be pure white, matted, dyed, or spun-dyed. The circular weft-knit or circular warp-knit fabric may also be treated by the dying or printing methods conventionally used in the textile industry.

Suitable materials which are useful for preparing the fabrics are interlock circular knit materials. For garments which are worn in contact with the body, circular weft-knit or circular warp-knit pile fabrics have proved suitable. In this case other yarns, for example cotton yarn, can be used for the pile loops.

The polysiloxane elastomer finish may be applied by a known process in which organopolysiloxanes, including alky-, phenyl-, and dialkylpolysiloxanes, as well as hydroxy- and alkylhydrosiloxanes, in this case particularly polymethylhydrosiloxanes, in aqueous emulsion or preferably in perchloroethylene, are applied to the fibers of the knitted fabric and are cross-linked thereon. This treatment, together with the use of textured yarns, produces very great elasticity in the knitted fabric, as described in German Offenlegungsschrift No. 17 94 170 and Japanese Published patent application No. 72/23717. This elasticity is not decreased by the polyurethane coating. Moreover, compared with the uncoated material, the polyurethane-coated material surprisingly shows a significant reduction in its resistance to deformation.

The silicone elastomer finish may be applied on both sides of the material, but is preferably applied only on the side which is not to be coated with polyurethane.

The polyurethane coating can be applied in the usual way by applying a urethane prepolymer to the circular weft-knit or circular warp-knit fabric and then carrying out further curing. Application of the polyurethane coating by the so-called reverse method has proved particularly satisfactory. Suitable prepolymers include standard commercial mixtures based on hydroxypolyesters, hydroxypolyethers or polyhydroxypolyesterurethanes and polyisocyanates.

The polyurethane may be dyed in a conventional manner, and the dyes used may also include fluorescent dyes. The polyurethane may also be colorless and exhibit the color of the underlying circular weft-knit or circular warp-knit fabric. The polyurethane coating may also be grained in a conventional manner.

The elastic polyurethane-coated circular weft-knit or circular warp-knit fabric may be prepared, for example, by the following process steps;

knitting the circular weft-knit or circular warp-knit fabric, washing the material in conventional apparatus, clamping the material on a tenter frame, dyeing and printing the material, e.g. using a transfer or screen printing method, drying on a tenter frame, treating the material with the polysiloxane, e.g. in perchloroethylene, re-stretching on a tenter frame at 150° C. with a lead of at least 25%, coating with polyurethane, e.g., by a reverse method, mechanically graining the coated material.

In order to remove creases from the polyurethane-coated fabric, it can also, if desired, be re-stretched on the tenter frame and steamed while simultaneously being wound up.

EXAMPLE

A circular weft-knit interlock fabric having a weight of about 130 g/m$^2$ was produced using a textured polyester filament yarn, dtex 76 f 35. It was coated with a layer weighing about 70 g/m$^2$ of polyesterurethane by the reverse process, to produce a fabric impervious to water (up to 80 cm water column) and having a permeability to water vapor of 200 g/m$^2$ (measured over 24 hours according to DIN 53 122). Samples of both the uncoated fabric and the polyurethane-coated fabric were treated with polysiloxane.

Measurement of the Tensional Elastic Properties

The tensional elastic properties of the fabrics according to the invention were studied using DIN 53 835, part 3, "Testing the Tensional Elastic Properties of Yarns and Threads Between Constant Elongation Limits with a Single Load-Recovery Cycle", since there is no DIN standard for circular weft-knit or circular warp-knit fabrics.

A single load-recovery cycle with two fixed limits of elongation was used to evaluate the elastic properties. Between the two limits, zero and the chosen upper limit, the sample is stretched without interruption, in particular, without any pause in the movement of the jaws at the limits of their travel, and at a constant jaw velocity in the forward and reverse directions. In this way, the load-elongation curve was recorded for one load-recovery cycle, as well as the load curve of the second load-recovery cycle, at least until the preloading tension was reached. From these curves the residual extension was determined, taking into account the preloading. The residual extension, the elastic extension, and the elastic recovery were calculated.

The experimental investigation was carried out according to DIN 53 857, part 2, "Simple Strip-Tensile Test for Flat Textile Goods". This draft DIN standard is concerned only with felts and other non-woven textile goods; there is still no applicable DIN standard for circular weft-knit or circular weft-knit or circular warp-knit fabric.

The testing was carried out on samples having a width of 90 mm clamped in each jaw with an original gage length of 200 mm and a pre-load of 300 cN. A deformation rate of 500 mm/min was used. The upper limit of extension in the lengthwise direction was set at 40%, and in the crosswise direction at 75%. The test results are given in Table 1 below.

TABLE 1

| Test Property | Lengthwise Direction | Crosswise Direction |
|---|---|---|
| Total extension (upper limit of extension) | 40.0% | 75.0% |
| Residual extension | 4.3 | 9.5 |
| Elastic extension | 35.7 | 65.5 |
| Elastic recovery | 89.2 | 87.3 |

For circular weft-knit and circular warp-knit fabrics of smooth untextured polyester filament yarn coated with polyurethane and provided with a polysiloxane finish, the tensional elastic properties are greatly inferior.

Determining the Resistance to Deformation

The fabrics, with and without polyurethane coating, and also with and without a polysiloxane elastomer finish, were tested to compare the load required for a predetermined elongation in the lengthwise and crosswise directions, respectively.

The initial region of the load-elongation diagram up to 40% extension in the lengthwise direction and 75% extension in the cross wise direction was used to determine the resistance to deformation.

The width of the sample, the sample length, the preloading and the rate of deformation were selected as in the tensional elastic properties test.

Since the extension during use (measurements made on people with arms and legs held straight or bent) is of the order of up to 30%, the following are the forces measured for 30% extension:

TABLE 2

| Material | Force (N) | |
|---|---|---|
| | Lengthwise | Crosswise |
| Uncoated with polyesterurethane | | |
| Without polysiloxane elastomer finish | 11 (FIG. 1,a) | 2.6 (FIG. 2,a) |
| With polysiloxane elastomer finish | 16 (FIG. 1,b) | 2.1 (FIG. 2,b) |
| Coated with polyesterurethane | | |
| Without polysiloxane elastomer finish | 216 (FIG. 3,a) | 39 (FIG. 4,a) |
| With polysiloxane elastomer finish | 67 (FIG. 3,b) | 23 (FIG. 4,b) |

BRIEF DESCRIPTION OF THE DRAWINGS

FIGS. 1 and 2 for the fabric not coated with polyurethane, and FIGS. 3 and 4 for the polyurethane coated fabrics. FIGS. 1 and 2 show the load-elongation diagram in the lengthwise direction of the surface texture, and FIGS. 2 and 4 show it in the crosswise direction. The curves designated (a) are the locus of values found for the flat fabrics without the polysiloxane elastomer finish, while those designated (b) indicate those for the fabrics having the polysiloxane finish.

Figure 1:
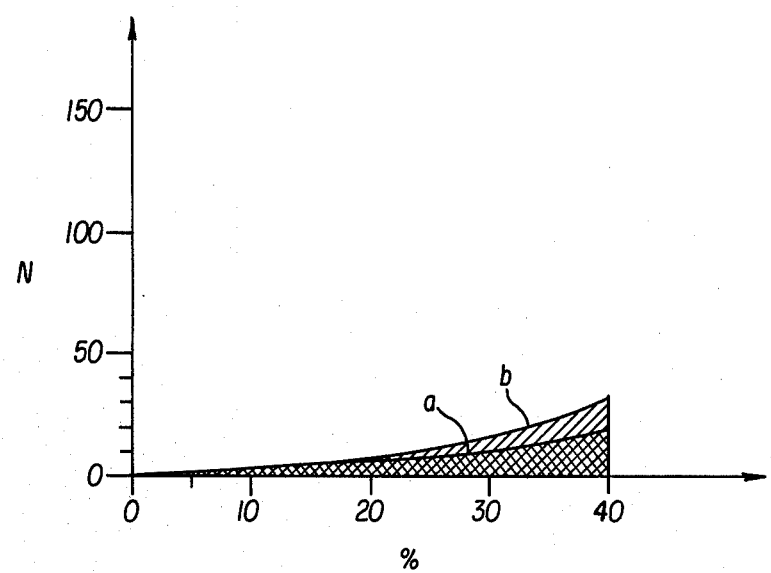
FIGS. 1-4 of the accompanying drawings show the load-elongation diagrams.
Figure 2:
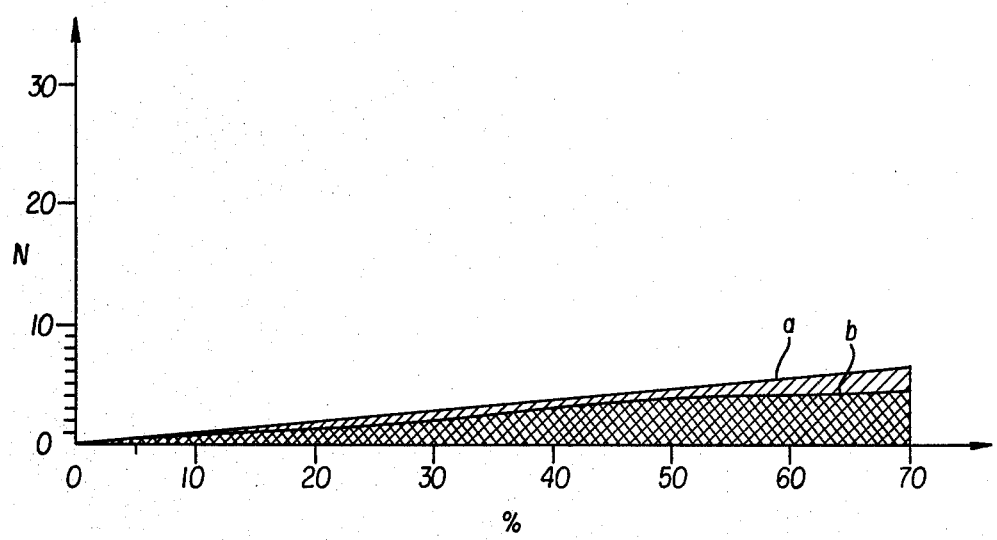
Figure 3:
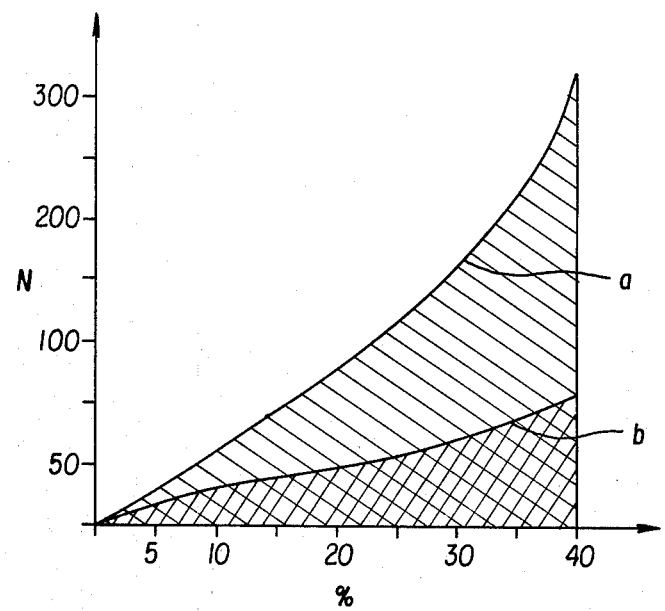
Figure 4:
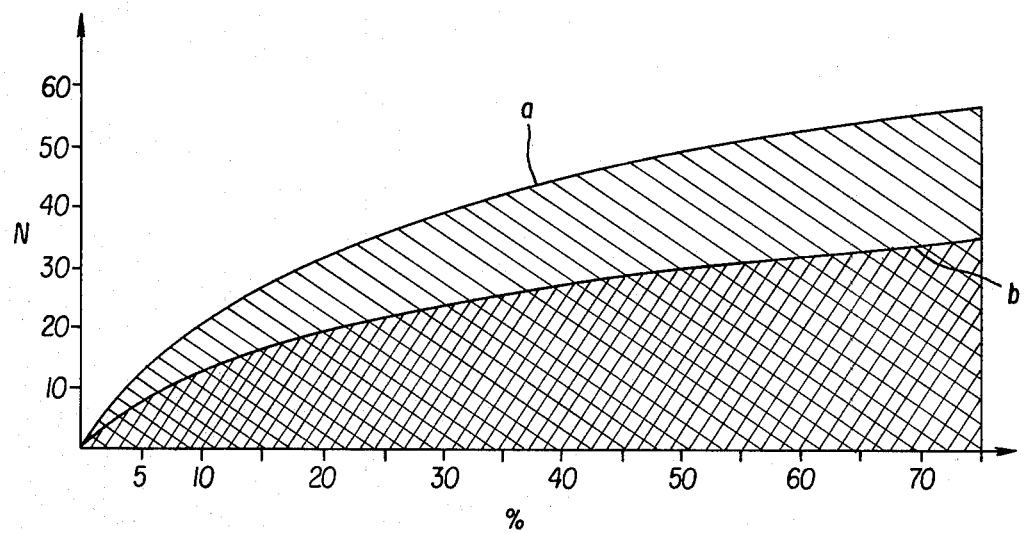

The single-hatched surfaces give the difference between the deformation work of the fabrics without polysiloxane elastomer finish and the fabrics having the polysiloxane elastomer finish. A comparison of FIGS. 1 and 2 with FIGS. 3 and 4 shows that for the fabrics which are not coated with polyurethane there is practically no change in the deformation force or work produced by the siloxane elastomer treatment, while for the polyurethane-coated fabrics a decrease in the deformation force or deformation work is evident.

The fabrics of the present invention are especially adapted for sport clothing such as training suits, sledding and ski clothing, as well as appropriate parts of clothing for water sports such as windsurfing, sailing, and canoeing. The fabric may also advantageously be used to produce garments for use by workers in occupations which have to be performed outdoors in all weather, such as seamen, road workers and trash collectors. Finally, the polyurethane-coated material is also suitable for stylish clothing such as raincoasts and disco-look outfits.

Figure 5:
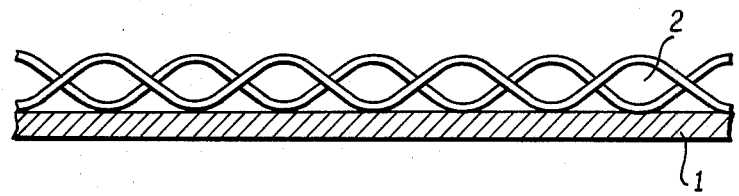
FIG. 5 depicts a smooth circular knit fabric.
Figure 6:
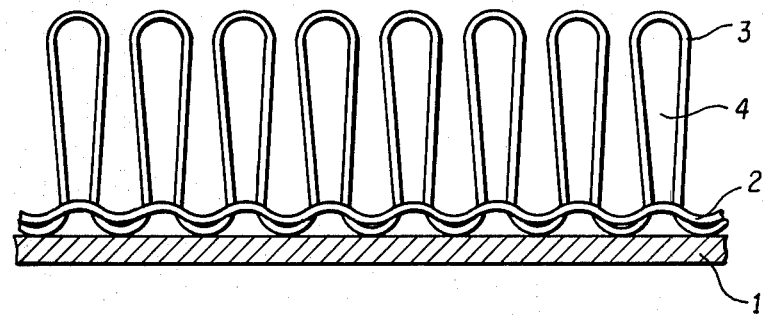
FIG. 6 depicts a pile fabric.

In the other figures, circular knit fabric according to the invention is depicted, in FIG. 5 a smooth circular knit fabric, in FIG. 6 a pile fabric. In the figures, No. 1 indicates the polyurethane layer, No. 2 indicates the knit fabric provided with a silicone elastomer finish, No. 3 indicates a pile fabric, No. 4 indicates the air cushion enclosed by the pile loop.

I claim:

1. Fabric comprising a web which is circular weft-knit or circular warp-knit from textured synthetic continuous-filament yarn, said web having a polyurethane coating and a polysiloxane elastomer finish.

2. Fabric according to claim 1 wherein, compared with a coated fabric which is not provided with a polysiloxane elastomer finish, said fabric exhibits a resistance to deformation, for extensions ranging up to 70% of the breaking elongation, which is lower by a ratio of 1:1.1 to 1:5.

3. Fabric according to claim 1 or claim 2 made from polyester filament yarn.

4. Fabric according to claim 1 or claim 2 wherein only one major surface of said fabric is coated with polyurethane and the other major surface is provided with a polysiloxane elastomer finish.

5. Fabric according to claim 1 or claim 2 wherein said circular knitted fabric is interlock bonded.

6. Fabric according to claim 4, having pile loops on the uncoated side of the said fabric.

7. A garment made from the fabric of claim 1 or claim 2.

8. A garment made from the fabric of claim 4.

* * * * *

UNITED STATES PATENT AND TRADEMARK OFFICE
CERTIFICATE OF CORRECTION

PATENT NO. : 4,350,725

DATED : September 22, 1982

INVENTOR(S) : Helmut C. Pfluger

It is certified that error appears in the above-identified patent and that said Letters Patent is hereby corrected as shown below:

On the title page, Insert:

(30) -- Foreign Application Priority Data

Oct. 26, 1979 (DE) Fed. Republic of Germany

2943263 --.

Signed and Sealed this

Fourth Day of January 1983

[SEAL]

Attest:

Attesting Officer

GERALD J. MOSSINGHOFF

Commissioner of Patents and Trademarks